June 5, 1928.
E. E. UNDERWOOD
1,672,841
PHOTOGRAPHIC CAMERA SPOOL HOLDER
Filed Sept. 24, 1925
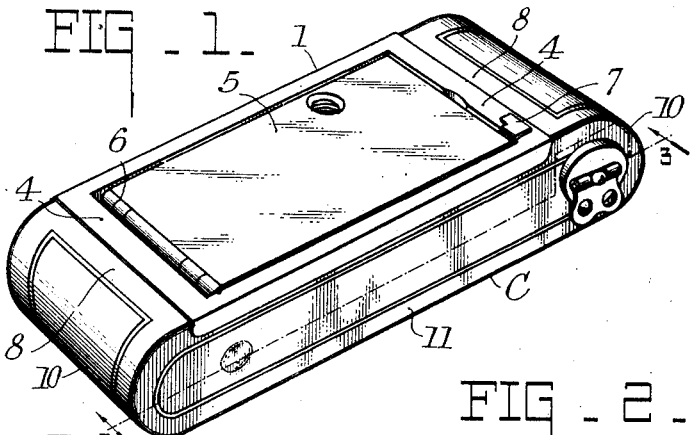
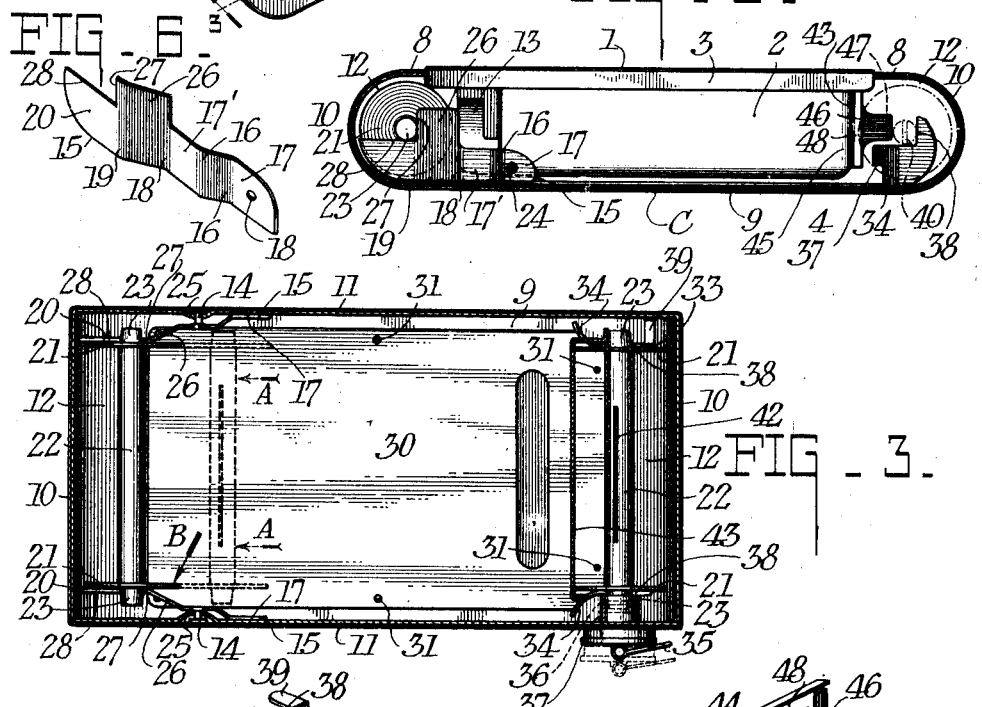
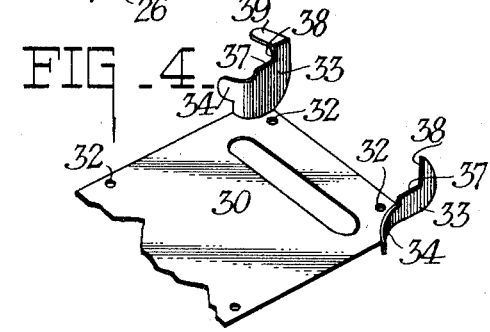
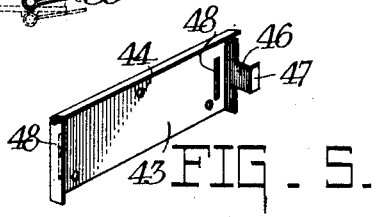
INVENTOR,
Ernest E. Underwood,
BY P. L. Stinchfield
ATTORNEYS.

Patented June 5, 1928.

1,672,841

UNITED STATES PATENT OFFICE.

ERNEST E. UNDERWOOD, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-CAMERA-SPOOL HOLDER.

Application filed September 24, 1925. Serial No. 58,283.

This invention relates to photography and more particularly to photographic roll film cameras of the folding type. One object of my invention is to provide a camera which can be easily loaded and unloaded. Another object is to provide a positive spool holding device for cameras. Another object is to provide a guideway for directing the film spools into the proper operating position in the spool chambers. Another object is to provide a means adapted to positively hold the supply spool in one chamber and properly position the take-up spool in another chamber to facilitate attaching the winding key to the spool and other objects will appear from the following specification, the novel features being pointed out in the claims at the end thereof.

This camera is an improvement over the camera shown in Patent No. 1,218,135, for photographic camera, issued March 6th, 1917, to myself and Reynolds.

In the drawings wherein like reference characters denote like parts throughout,—

Fig. 1 is a perspective view of the outside of a camera in which spool centering devices constructed in accordance with and illustrating one form of my invention are employed;

Fig. 2 is a section through the camera shown in Fig. 1, parts being shown in elevation. This section is taken just inside of one of the casing side walls;

Fig. 3 is a section on lines 3—3 of Fig. 2;

Fig. 4 is a fragmentary detail perspective view of one end of the camera bottom plate;

Fig. 5 is a perspective view of a bracket used in connection with the spool-holding mechanism; and Fig. 6 is an enlarged perspective view of one of the spring members used to hold a film spool.

Like the camera shown in the patent above referred to, the present embodiment of my invention consists of a two-part camera. One part consists of a body member 1 which is provided with a bellows-holding frame 2, side flanges 3 and end plates 4, which engage and make a light tight joint with the camera casing C. The body section carries a bed 5 hinged at 6 to the casing and adapted to be opened by means of a handle 7. The camera casing consists of a shell having top walls 8, a bottom wall 9 and curved end walls 10. Side walls 11 are also a part of the casing so that spool chambers 12 are formed in both ends of the camera casing. These chambers are accessible only when the body portion 1 is removed.

To enter the film spools in the spool chambers the body portion is removed from the casing and the spools may be rolled into position through the opening thus made. The body portion 1 is preferably attached to the body by means of spring latches 13 which are adapted to engage portions of the camera casing, not shown, and which may be released by the pins 14 of the camera walls 11. As thus far described, the parts form no part of my present invention.

It is desirable to hold the film supply spool securely in the camera casing while threading the film backing paper across to a take-up spool in the opposite spool chamber. To do this the following mechanism is used. The camera walls 11 are provided with springs 15 which, as shown in Fig. 6, consist of plates bent outwardly at 16 forming base 17 which is attached to the wall 11 by means of a rivet passing through the aperture 18. After being bent at 16' there is a flat portion 17' which is again bent at 18 and 19 so as to leave the flat flange 20 which is adapted to engage the end flange 21 of a spool. This spool is of the type usually used in small-sized cameras and comprises a shank 22 and spool trunnions 23 extending out beyond the end of the spool flanges.

The spring members 15 are attached to the walls 11 with rivets 24 so that the flat portion 17 lies against the wall and the flat portion 17' is spaced from the wall so as to give clearance for the formed-in portion 25 of the side walls 11. In addition this portion of the spring forms a guideway for directing the spool trunnions 23 towards the spool chamber 12. It will be noted that portion 26 of the spring member is made of greater thickness than the rest of the metal piece so that this provides a shoulder 27 which terminates in a straight upper edge 28. When loading the spool may be placed in the position shown in dashed lines in Fig. 3. By thrusting in the direction shown by the arrows A, the spool trunnions 23 are brought into contact with the bent portion 26 of the springs 15 and by pressing the spool towards the end of the camera, these springs give toward the walls 11 and permit the trunnions to be caught behind the shoulders 27. In this position the trunnions are adapted to rest on the straight edges 28 and the spool is prevented from being withdrawn by means of the shoulders 27. When it is desired to remove the empty spool from this chamber, a flange may be pressed in the direction indicated by the arrow B. This causes the spool to move toward the wall 11 and permits one trunnion 23 to be disengaged from the shoulder 27 so as to spring outwardly, after which it may be readily removed.

The spool holder just described is for the supply spool which carries the convolutions of film and paper when loaded into the camera. The end of the backing paper is drawn from this spool to a second similar spool in the opposite end of the camera known as the take-up spool. The take-up spool is not latched in position as was the case with the supply spool but it may be held in the proper position in the following manner. In the camera casing there is a flat plate 30 which is attached to the camera casing by the rivets 31 which pass through apertures 32 in the plate. As shown in Fig. 4, the ends of the plate have formed-up portions 33, each of which is provided with an outwardly flaring flange 34. These flanges are positioned so as to direct a film spool into the proper reeling position in which it may be engaged by means of a winding key 35. As is usual with this type of camera, the winding key may be drawn out into the position shown in dashed lines in Fig. 3, so that the pin 36 which extends across the tubular member 37 lies beyond the end of the spool trunnion 23. This permits the spool to roll freely into position. The flanges 21 of the spool by striking the converging guideways 34 direct the trunnions to the short tracks 37, upon which the trunnions may ride. One track 37 is provided with a stop 38 and a flange 39 extending over to the camera wall 11. This flange is adapted to receive any axial thrust which may be exerted when the winding key 35 is moved inwardly to engage the pin 36 in the usual slot 40 in the end of the spool trunnion.

After the spool has been positioned for winding the convolutions of film and paper, by moving the winding key to the position shown in full lines in Fig. 3, the spool end opposite the winding key is now held against outward movement. In the initial threading up of the backing paper the spool may be either held by hand or the backing paper may be merely inserted in slot 42 so that the camera body 1 can be attached to the casing C. The film spool will be held in an operative position by the camera body.

This is accomplished by means of the bracket 43, shown in Fig. 5. This bracket is attached by rivets passing through the apertures 44 to the end 45 of the camera body and there is a flange 46 provided at one end of the bracket. This flange is preferably formed over at 47. Slots 48 are cut in the bracket to provide clearance for the spool flanges 21. When the camera body is inserted into the casing member 46 provides a stop which is adapted to contact with a spool trunnion 23 so that movement of the spool towards the body is prevented. The opposite spool trunnion, of course, is held against movement by the tube 37 which carries the pin 36 engaging the slotted end 40 of the spool.

With the construction above described, it will be seen that the take-up spool is guided into the spool chamber 12 and that as it moves toward this chamber the trunnions are adapted to ride upon tracks 37 and so position the spool that it will be axially aligned with the film-winding key. This greatly facilitates entering the winding key into the spool slot. It should also be noticed that an axial thrust exerted upon the winding key will not move the spool from its proper winding position, because the flange 39, by resting against the wall 11, prevents the spool from becoming displaced.

The operation of loading a camera constructed in accordance with my invention is as follows. The camera body 1 is removed from the casing C and a film cartridge (only the spool of which is shown in Fig. 3) is dropped into the casing and thrust against the action of the springs 15 into an operative position in which the trunnions 23 snap behind the shoulders 27. The backing paper may be then drawn out sufficiently to enter the end in a slot 42 of an empty spool. This spool may be rolled towards the spool chamber into which it is guided by the converging tracks 34. These tracks direct the trunnions 23 upon the runways 37 upon which the spool moves until the spooled trunnions strike the stops 38. In this position the flanges 21 lie against or adjacent to the formed-up portions 33 of the bottom plate 30. The winding key is then moved inwardly and turned until the pin 36 engages in the spool slot 40. The camera body 1 may be then replaced and the first exposure area of the film may be wound into place.

After all of the exposures have been completed, the body member 1 is again removed from the casing and the take-up spool may be removed by merely withdrawing the winding key 35. The empty supply spool may be removed by thrusting downwardly on one flange releasing the opposite spool trunnion from its hook and permitting the spool to be removed.

Having thus described my invention, what

I claim as new and desire to secure by Letters Patent is:

1. In a camera, the combination with a casing having film chambers at both ends including front, rear, outer, and end walls and having an opening between said walls for loading film in the camera, of a removable and replaceable body member adapted to close the film loading opening, and means carried by the casing member for holding a film spool in a film chamber independent of the position of the body member.

2. In a camera, the combination with a casing having film chambers at both ends including front, rear, outer, and end walls, of a removable and replaceable body member, giving access to the spool chambers, and spring actuated spool engaging mechanism adapted to hold a spool in a spool chamber when the spool is thrust into the chamber after the body portion of the camera has been removed.

3. In a camera, the combination with a casing having enclosed film chambers at both ends and a removable and replaceable body portion, of means for guiding and retaining a film spool in an enclosed chamber comprising a spring member, a spool guideway formed on the spring for directing a film spool into the spool chamber into a position in which it may be retained by the spring member.

4. In a camera, the combination with a casing including spool chambers adapted to receive a film spool having trunnions extending beyond spool flanges, of a spool-holding mechanism including spring members adapted to guide a spool into a spool chamber, and a latch mechanism included in the spring for snapping behind the spool trunnions for holding the spool in the chamber.

5. In a camera, the combination with a casing including spool chambers adapted to receive a film spool having trunnions extending beyond the spool flanges, of a spool guiding mechanism including spaced plates tapering toward each other and carrying flanges upon which the spool trunnions may ride to position the spool in the camera.

6. In a camera, the combination with a casing including spool chambers adapted to receive a film spool having trunnions extending beyond the spool flanges, of a spool guideway for directing a spool into a spool chamber including tracks upon which the spool trunnions may roll, said tracks being spaced further apart at one end than at the other.

7. In a camera, the combination with a casing including spool chambers adapted to receive a film spool having trunnions extending beyond the spool flanges, of a spool guideway for directing a spool into a spool chamber including converging tracks adapted to support the trunnions of a spool being directed to the spool chambers, portions of the tracks being adapted to lie adjacent the film spool flanges.

8. In a camera, the combination with a casing having spool chambers adapted to receive a film spool having trunnions extending beyond the spool flanges, of a curved guideway to direct the spool into a chamber, the curved guideway being adapted to contact with parts of the spool to position the spool relative to the spool chamber, and spool trunnion supporting rails for carrying the spool after it has been positioned in the spool chamber.

9. In a camera, the combination with a casing having spool chambers adapted to receive a film spool having trunnions extending beyond the spool flanges, of a curved guideway to direct the spool into a chamber, the curved guideway being adapted to contact with parts of the spool to position the spool relative to the spool chamber, spool trunnion supporting rails in the spool chamber, and stops at the ends of the rails whereby movement of the spool into the spool chamber may be limited in two directions by the rails and stops.

10. In a roll holding camera, the combination with spool chambers, of means for retaining a spool in a spool chamber including a spring member and a guideway included in the spring member for directing a spool to a latching position.

11. In a roll holding camera, the combination with spool chambers having top, bottom and end walls, of spool holding means for retaining a spool in the spool chamber including spaced spring members movable to and from each other, spool receiving slots in the spring members and means including guideways for directing a spool between the springs.

Signed at Rochester, New York, this 21st day of September 1925.

ERNEST E. UNDERWOOD.